United States Patent
Bashant et al.

(10) Patent No.: US 7,386,575 B2
(45) Date of Patent: Jun. 10, 2008

(54) SYSTEM AND METHOD FOR SYNCHRONIZING RELATED DATA ELEMENTS IN DISPARATE STORAGE SYSTEMS

(75) Inventors: David M. Bashant, Belmont, NC (US); Donald E. Buddenbaum, Greenwood, IN (US); Michael L. Denny, Charlotte, NC (US); Daniel M. Yellin, Monsey, NY (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 10/614,968

(22) Filed: Jul. 8, 2003

(65) Prior Publication Data
US 2004/0098546 A1 May 20, 2004

(51) Int. Cl.
*G06F 17/30* (2006.01)

(52) U.S. Cl. .................. 707/201; 707/203; 707/102; 707/3; 707/4; 711/162; 711/112; 711/156

(58) Field of Classification Search ............. 707/100, 707/102, 200, 201, 202, 203, 204, 10, 8, 707/6; 709/248; 705/50
See application file for complete search history.

(56) References Cited

U.S. PATENT DOCUMENTS

| | | | | |
|---|---|---|---|---|
| 4,930,073 A | * | 5/1990 | Cina, Jr. ................... | 710/200 |
| 5,684,990 A | * | 11/1997 | Boothby ..................... | 707/203 |
| 5,870,765 A | * | 2/1999 | Bauer et al. ................ | 707/203 |
| 5,884,325 A | * | 3/1999 | Bauer et al. ................ | 707/201 |
| 5,913,061 A | | 6/1999 | Gupta et al. | |
| 6,064,989 A | * | 5/2000 | Cordery et al. ............... | 705/50 |
| 6,219,671 B1 | | 4/2001 | de Vries et al. | |
| 6,295,541 B1 | * | 9/2001 | Bodnar et al. ............. | 707/203 |
| 6,324,693 B1 | | 11/2001 | Brodersen et al. | |
| 6,397,224 B1 | | 5/2002 | Zubeldia et al. | |
| 6,401,104 B1 | * | 6/2002 | LaRue et al. ............... | 707/203 |
| 6,418,441 B1 | | 7/2002 | Call | |
| 6,446,176 B1 | * | 9/2002 | West et al. ................. | 711/162 |
| 6,449,688 B1 | | 9/2002 | Peters et al. | |
| 6,529,917 B1 | * | 3/2003 | Zoltan ........................ | 707/201 |
| 6,636,897 B1 | * | 10/2003 | Sherman et al. ............ | 709/248 |
| 6,732,122 B2 | * | 5/2004 | Zoltan ........................ | 707/201 |
| 6,862,617 B1 | * | 3/2005 | Wu ............................. | 709/224 |
| 2005/0044354 A1 | * | 2/2005 | Hagerman .................. | 713/160 |

* cited by examiner

*Primary Examiner*—Charles Rones
*Assistant Examiner*—Belix M Ortiz
(74) *Attorney, Agent, or Firm*—William Scheisser; Hoffman, Warnick & D'Alessandro LLC (57) ABSTRACT

A system and method for tracking and synchronizing related data elements in disparate storage systems is provided. More particularly, the present invention provides a hub system for cross-referencing and maintaining storage system information for the efficient synchronization of related data elements in disparate storage systems.

10 Claims, 6 Drawing Sheets

SYSTEM AND METHOD FOR SYNCHRONIZING RELATED DATA ELEMENTS IN DISPARATE STORAGE SYSTEMS

CROSS-REFERENCE TO RELATED APPLICATIONS

This application is related in some aspects to commonly assigned U.S. application Ser. No. 09/696,137, filed Oct. 25, 2000, now U.S. Pat. No. 6,636,875 and entitled System and Method for Synchronizing Related Data Elements in Disparate Storage Systems, which is hereby incorporated by reference.

BACKGROUND OF THE INVENTION

1. Technical Field

The present invention generally relates to a system and method for tracking and synchronizing related data elements in disparate storage systems. More particularly, the present invention provides a system and method for dynamically tracking and synchronizing related data elements stored in disparate storage systems of an enterprise system.

2. Background Art

The efficient and consistent storage of data is a necessary component of successful business. It is common for companies to have large enterprise systems having many storage systems with data replicated there between. Accordingly, when data must be treated (created, moved, modified or deleted) or referenced in one system it is necessary for the data to be similarly treated or referenced in other systems. For example, an insurance company may maintain the name and addresses of its customers in an customer storage system as well as in billing and claims storage systems. As data is created, modified or deleted in the customer storage system, the same changes often have to be propagated in the billing and claims storage systems so the data and storage systems are "synchronized."

Heretofore, several techniques have been implemented to help solve this problem. One example is known as a "publish and subscribe" mechanism in which one storage system will treat a data element and then instruct other storage systems about the treatment. However, under the "publish and subscribe" mechanism, upon receiving an instruction to treat a data element, the receiving storage system must still locate the data element within its own system. For example, if the claims storage system receives an instruction to modify a particular customer's address, the claims storage system must first determine the location of the particular customer's address within the claims database. Without system-specific identifiers, it may be impossible to locate the storage location of the particular data element. Hence, an additional technique is required to map between system identifiers of the various storage systems.

Another technique is disclosed in U.S. Pat. No. 5,913,061, to Gupta et al., which teaches a collaboration system for defining interaction between applications. The system of Gupta et al. requires that a connector communicate with each application to serve as an intermediary between the application and the collaboration system. However, each connector must store mapping information for its corresponding application, thus, fragmenting the storage of the mapping information among the multiple locations (connectors). By distributing the mapping function to each connector, more burden is placed upon the builder of the connector, and the ability to reuse mapping code (across multiple collaborations) is diminished. Additionally, storing this information in each connector requires that each connector be stateful (have persistent storage associated with it). This also complicates the building and maintenance of connectors. Additionally, the approach of Gupta et al. requires a two step mapping process, first mapping the identifiers from the sending application to the collaboration and then mapping the identifiers from the collaboration to the receiving application. This is less efficient than directly mapping sending application identifiers to receiving application identifiers. Additionally, the system of Gupta et. al. requires that all communication between applications be reformatted by the connectors into the format of the collaboration system. This can be redundant and inefficient if the systems to be integrated and synchronized already make use of a standard protocol and the only translation needed is to map application identifiers from one application to another.

Still other systems have used a cross-reference facility whereby each data element is associated with a record identifier for each system in which the data element is stored. Thus, when a change is made at one system, the system will inform the other systems of the change. However, this requires that all systems maintain a table or the like indicating where the data element is stored on all other systems. Moreover, complications can arise when there is not a one-to-one correspondence between records in each system. For example, a customer's contact information may be stored in one record in the claims storage system, but in three records in the billing storage system. Thus, the amount of information that each storage system must maintain is increased.

In view of the above, there exists a need for a system and method for dynamically tracking/synchronizing related data elements in disparate storage systems. Moreover, there exists a need for such a system and method that does not require each storage system to maintain high volumes of storage information for the other systems. In addition, there exists a need for such a system and method that does not require re-formatting of communication between storage systems. There also exists a need to provide these functions as a re-usable centralized service that is efficient and avoids multiple translations between identifiers.

SUMMARY OF THE INVENTION

The present invention overcomes the problems associated with existing systems by providing a system and method for dynamically tracking/synchronizing related data elements between disparate storage systems. More particularly, the present invention provides a hub system that maintains storage information for each storage system of an enterprise system so that treatment of data in one storage system can be efficiently synchronized the other storage systems.

According to a first aspect of the present invention, a system having a table of keys for synchronizing related data elements between a first and second storage system is provided. Each key comprises: (1) a universal identifier corresponding to a data element in the first and second storage system; (2) a first record identifier corresponding to the data element in the first storage system; and (3) a second record identifier corresponding to the data element stored in the second storage system.

According to a second aspect of the present invention, a system for synchronizing related data elements between a first and second storage system is provided. The system comprises: (1) a header reading system for receiving an instruction the first storage system, wherein the instruction has a first header that includes a first identifier; (2) a table interface for accessing a table to identify a second identifier based on the first identifier; (3) a header generation system for generating a second header corresponding to the second storage system; and (4) an instruction passing system for passing the instruction and the second header to the second storage system.

According to a third aspect of the present invention, a method for synchronizing related data elements between a first and second storage system is provided. The method comprises the steps of: (1) receiving an instruction having a first header from the first storage system, wherein the first header includes a first identifier; (2) identifying the second storage system; (3) accessing a table to cross-reference the first identifier with a second identifier; (4) generating a second header that corresponds to the second storage system and attaching the second header to the instruction; and (5) sending the instruction to the second storage system.

According to a fourth aspect of the present invention, a program product stored on a recordable media for synchronizing related data elements between a first and second storage system is provided. The program product comprises: (1) a header reading system for receiving an instruction from the first storage system, wherein the instruction includes a first header that has a first identifier; (2) a table interface for accessing a table to identify a second identifier based on the first identifier; (3) a header generation system for generating a second header corresponding to the second storage system; and (4) an instruction passing system for passing the instruction and the second header to the second storage system.

It is therefore an advantage of the present invention to provide a system and method for synchronization of related data elements between disparate storage systems by automatically mapping system-specific identifiers without intervention by the storage systems themselves. It is a further advantage of the present invention to provide a hub system that maintains information for all data elements in the storage systems so that treatment of a data element in one storage system can be efficiently synchronized with the other storage systems. It is still a further advantage of the present invention to provide a system and method for mapping system-specific identifiers without needing to read or understand the instruction itself, whereby communication between storage systems need not be re-formatted.

BRIEF DESCRIPTION OF THE DRAWINGS

These and other features and advantages of this invention will be more readily understood from the following detailed description of the various aspects of the invention taken in conjunction with the accompanying drawings in which.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE DRAWINGS

For convenience, the description includes the following sections:
I. Definitions
II. Computer System
III. Hub System Overview
IV. Illustrative Flows
   A. New Data Element Creation
   B. Modification or Reference of an Existing Data Element
   C. Deletion of a Data Element
   D. Updating Identifiers

I. DEFINITIONS

For the purposes of this disclosure, the following terms have the following meanings:

Data Element—a specific set of data, such as a customer's contact information;

Universal Identifier—a unique value, symbol or combination thereof that is used to identify a specific data element universally;

Record Identifier—a value symbol or combination thereof that is used to identify a location of a data element within a particular storage system;

Storage System—any application in an enterprise system that acts upon a data element stored therein;

Storage System Name—the symbolic name of a particular storage system;

Instruction—a message that is sent to or from a storage system.

Header—an attachment to an instruction that includes, at least, either a universal identifier, or a record identifier and storage system name. The header is used by the hub system and storage systems to identify the treatment or reference of a particular data element and the location(s) thereof.

Sending Storage System—a storage system that is sending an instruction;

Receiving Storage System—a storage system that is receiving an instruction;

Treated Data Element—a data element that has been created, deleted, modified or moved; and Action Code—included with a header or an instruction indicating how a data element was treated (e.g., created, modified, deleted or moved) or referenced.

II. Computer System

Generally stated, the present invention provides a system and method for dynamically tracking/synchronizing related data elements between disparate storage systems. Specifically, the present invention comprises a hub system that communicates with all storage systems of an enterprise system and that includes a table or the like of information pertaining to each storage system. This allows treatment of a data element in one storage system to be efficiently synchronized with the other storage systems. Moreover, this: (1) avoids storage systems having to "know" storage details relating to the other storage systems; (2) simplifies communication patterns; and (3) centralizes the administration and implementation of business policies.

Figure 1:
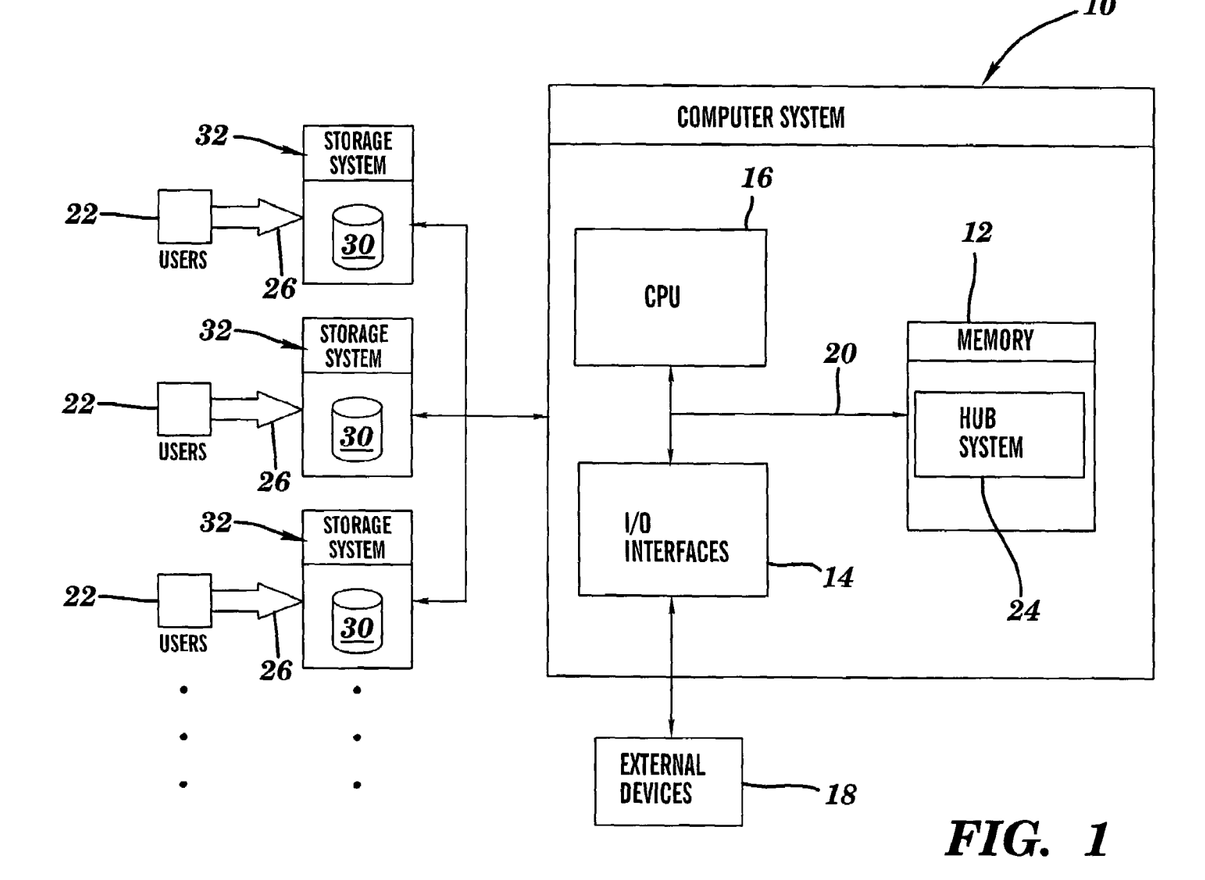
FIG. 1 depicts a block diagram of a computer system having a hub system in accordance with the present invention.

Referring now to FIG. 1, a computer/server system 10 depicting the hub system 24 of the present invention is shown. The computer system 10 generally comprises memory 12, input/output interfaces 14, a central processing unit (CPU) 16, external devices/resources 18, and bus 20. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand held device, keyboard, mouse, voice recognition system, speech output system, printer, facsimile, pager, personal digital assistant, etc. Bus 20 provides a communication link between each of the components in the server system 10 and likewise may comprise any known type of transmission link, including electrical, optical, wireless, etc. In addition, although not shown, additional components, such as cache memory, communication systems, system software, etc., may be incorporated into computer system 10.

Stored in memory 12 is hub system 24 (shown in FIG. 1 as a software product). Hub system 24 will be described in more detail below but generally comprises a system and method for tracking/synchronizing related data elements between disparate storage systems 32 in an enterprise system. Each storage system 32 includes a database 30 that may comprise one or more storage devices, such as a magnetic disk drive or an optical disk drive. In another preferred embodiment, databases 30 include data distributed across, for example, a local area network (LAN), wide area network (WAN) or a storage area network (SAN) (not shown). Each database 30 may also be configured in such a way that one of ordinary skill in the art may interpret it to include multiple databases.

A user 22 seeking to treat (create, modify, delete or move) or reference a data element in a storage system 32 will access the computer system 10 and the hub system 24 via communications network 26 and storage systems 32. Communications network 26 can be a direct terminal connected to the computer system 10, or a remote workstation in a client-server environment. In the case of the latter, the client and server may be connected via the Internet, wide area networks (WAN), local area networks (LAN) or other private networks. The server and client may utilize conventional token ring connectivity for WAN, LAN, or other private networks, or Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

Once the user 22 has gained access to a storage system 32, the user 22 can treat or reference data elements and then utilize hub system 24 to synchronize the treated or referenced data elements with the other storage systems 32. It is understood that the present invention can be realized in hardware, software, or a combination of hardware and software. As indicated above, the computer system 10 according to the present invention can be realized in a centralized fashion in a single computerized workstation, or in a distributed fashion where different elements are spread across several interconnected computer systems (e.g., a network). Any kind of computer system—or other apparatus adapted for carrying out the methods described herein—is suited. A typical combination of hardware and software could be a general purpose computer system with a computer program that, when loaded and executed, controls the computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material document.

III. Hub System Overview

Figure 2:
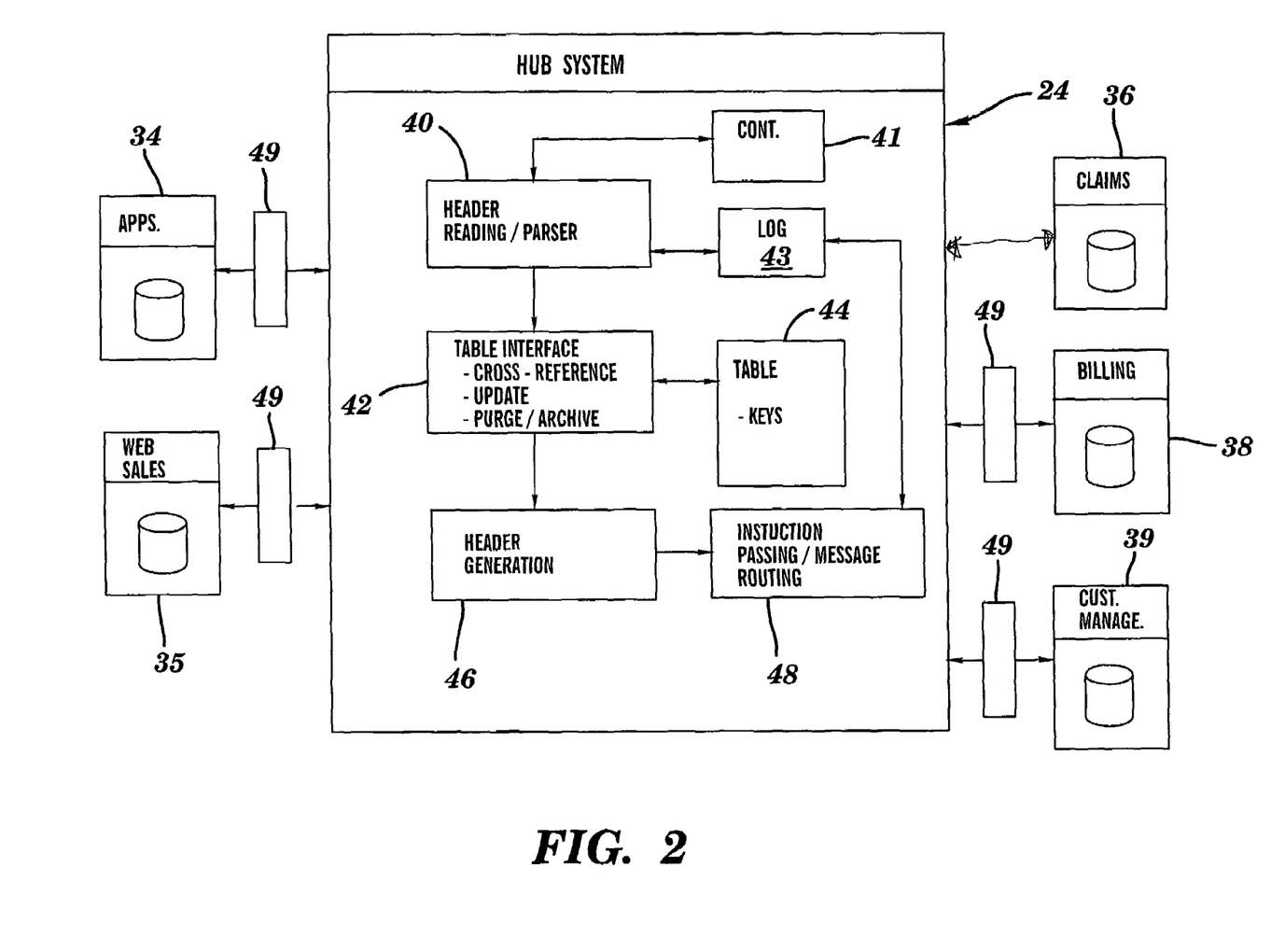
FIG. 2 depicts a block diagram of the hub system of FIG. 1.

Referring now to FIG. 2, the hub system 24 is shown in greater detail in conjunction with an exemplary insurance enterprise system. As depicted, the hub system 24 includes header reading system or parser 40, controller 41, table interface 42 for cross-referencing, updating and managing a table 44 of keys, log system 43, header generation system 46 and instruction passing system 48. Connected to the hub system 24 are application storage system 34 (e.g., a call center), web sales storage system 35, claims storage system 36, billing storage system 38 and customer management storage system 39. It should be understood, however, that the quantity and names depicted for the storage systems are illustrative and not intended to be limiting.

Under the present invention, if application storage system 34 treated (created, deleted, modified or moved) a data element (aggregate) stored therein, an instruction would be sent to the hub system 24 so that the treated data element can be synchronized in the other storage systems 35, 36, 38 and 39. Similarly, if the application storage system 34 referenced a data element, an instruction would be sent to the hub system 24 so that other storage systems 35, 26, 38 and 39 can be notified thereof. The instruction can be in any format (e.g., XML), depending on the particular enterprise system (e.g., insurance company or financial company) and business process being executed (e.g., filing an insurance claim or becoming a new customer). The instruction preferably includes a header having an identifier. The identifier, as will be described in further detail below, informs the hub system 24 of the precise data element that was treated. Accordingly, if multiple data elements were treated or referenced, the header will include multiple identifiers.

By using headers, the present invention can be implemented with any existing enterprise system without having to alter the communication means between the storage systems thereof. For example, a company might have storage systems that communicate in a particular extended mark-up language (XML) format. With the header, the communication (instruction) itself need not be reformatted or revised into a format understandable by the hub system 24. In contrast, all information needed by the hub system 24 is contained in the header.

The header can be generated by a sending storage system or an adapter 49, depending on the particular storage system and/or enterprise system. The purpose of the header is to provide the hub system 24 with information to facilitate mapping between identifiers of separate storage systems in a language that can be understood. For example, the storage systems may communicate in a different language and/or format than the hub system 24 understands. In this case, the adapter 49 for the sending storage system (e.g., applications storage system 34) generates a header in the language of the hub system 24, while leaving the core message in the language of the storage systems. The hub system 24 will read and interpret the header and pass the message to other storage systems. Thus, the header eliminates the need for a sending storage system to communicate in the language of the hub system 24 while still allowing the hub system 24 to map between identifiers of separate storage systems. Similarly, an adapter 49 for a receiving storage system (e.g., the billing storage system 38) will directly locate record locations in the receiving storage system based on the header. Accordingly, the need for the receiving storage systems to communicate in the language of the hub system 24 is eliminated as well.

As further shown in FIG. 2, some storage systems (e.g., the claims storage system 36) have the capability to read/generate headers without the aid of an adapter 49. This may be the case where the storage systems have been constructed to interact with the hub system 24.

Figure 5:
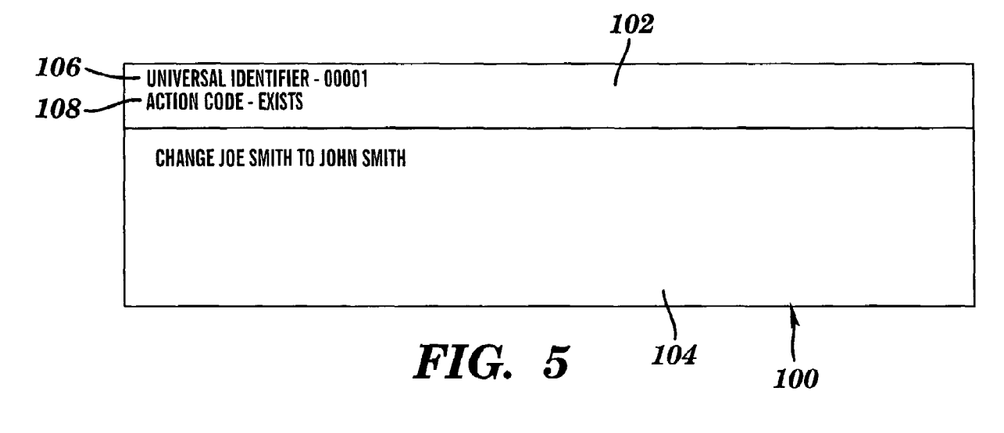
FIG. 5 depicts a first instruction and header, according to the present invention.
Figure 6:
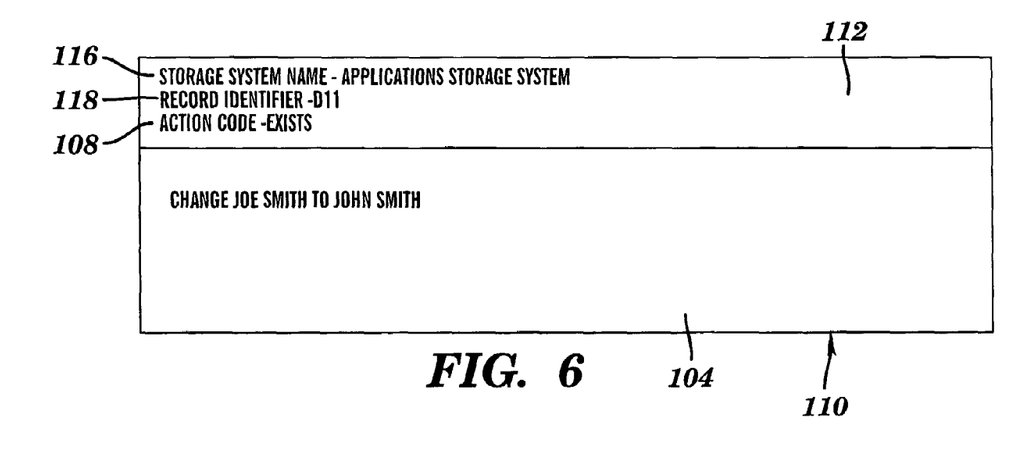
FIG. 6 depicts a second instruction and header, according to the present invention.

FIGS. 5 and 6 show two examples of an instruction with a header attached thereto, as sent from a sending storage system to the hub system. Referring first to FIG. 5, the instruction 100 includes a message 104 indicating how the data element was treated and a header 102. In this case, the name Joe Smith was changed to John Smith. The header 102, includes a universal identifier 106 and a action code 108. The universal identifier 106 is used by the hub system to identify the data element and to determine the locations of the data element in the other storage systems. This occurs by cross-referencing the universal identifier in the table to identify the system names and record identifiers of other systems where the treated data element is stored. The action code informs the hub system 24 of how the data element was treated.

FIG. 6 shows a second example of an instruction 110 comprised of a message 104 and header 112. In this embodiment, the message 104 and action code 108 remain the same, however, other header information is different. Specifically, the header 112 includes the storage system name 116 of the storage system (i.e, application) that treated the data element as well as the record identifier 118 indicating the location of the data element within the application storage system. The hub system will use the storage system name and record identifier in the header to identify the treated data element as well as the names and record identifiers for the other storage systems where the treated data element is stored. Accordingly, based on FIGS. 5 and 6, the treated data element can be identified and synchronized based on either: (1) the universal identifier; or (2) the name and record identifier(s) of the storage system that first treated the data element (i.e., the sending storage system).

It should be understood that although the instructions and headers shown in FIGS. 5 and 6 depict the treatment of one data element, other variations exist. Specifically, as indicated above, multiple data elements may be treated or referenced in one instruction. For example, an insurance customer may file a claim for an accident. In this case, an instruction indicating the filing of the new claim might include: (1) a customer contact information data element; (2) an accident data element; and (3) a policy data element. Accordingly, the header for this instruction would include information (e.g., record identifiers, action codes and optional system information) corresponding to each treated or referenced data element. This example also illustrates that while the instruction may inform other storage systems about a particular business process event (e.g., the filing of a claim), the header only includes information about a particular data element being treated or referenced.

Referring back to FIG. 2, as an instruction is received by the hub system 24 (e.g., from the application storage system 34), the header is read by the header reading system 40, which communicates with the controller 41. The controller 41 determines which of the other storage systems should receive the instruction. These receiving storage systems may be designated at the sending storage system level and included in the instruction or header, or they may be determined based on a default behavior stored in the controller. In the case of the former, the header reading system 40 would read the header and pass the information therein to the controller 41, which would identify the receiving storage systems and inform table interface 41 of the same. In the case of the latter, the default behavior could be stored in the controller 41. For example, default behavior might dictate that all storage systems should receive all modification instructions. Thus, if an instruction received by the hub system 24 indicated the modification of a data element, the controller 41 would inform the table interface 42 that all storage systems should receive the instruction.

In either case, the table interface 42 will access the table 44 and use the information in the header (e.g., universal identifier, or storage system name and record identifier) to cross-reference the treated or referenced data element in the other storage systems identified by the controller 41. Accordingly, the information/identifiers contained in the header serves as keys that are used to cross-reference information for other storage systems. Once the information/identifiers for the other storage systems 35, 36, 38 and 39 have been cross-referenced, the header generation system 46 will generate a header for each storage system. The newly generated headers should include identifiers informing the other storage systems 35, 36, 38 and 39 of the precise locations of the treated or referenced data element therein. After generation, the headers will be attached to the instruction and sent to the storage systems 35, 36, 38 and 39. This may require duplication of the instruction, which can be done by instruction passing system 48 (also known as message routing system).

In view of the above, the accurate maintenance of the table 44 within the hub system 24 allows a data element to be treated or referenced by one storage system and then synchronized with the other storage systems. Moreover, the maintenance of the table 44 by the hub system 24 prevents each storage system 34, 35, 36, 38 and 39 from having to separately maintain information synchronizing to the other storage systems. It should be appreciated that although a specific exemplary embodiment for the hub system 24 and the sub-systems thereof is depicted in FIGS. 1-4, other equivalent variations exist. For example, the instruction passing system 48 and the header generation system 46 can exist as one system.

As further shown in FIG. 2, the hub system 24 may also include log system 43. Log system 43 communicates with header reader 40 and instruction passing system 48 to create a record of all instructions received or sent by the hub system 24. This allows users of the hub system 24 to keep statistics regarding, among other things, the treatment of data elements and the volume of instruction sending/receiving performed by each storage system.

Figure 3:
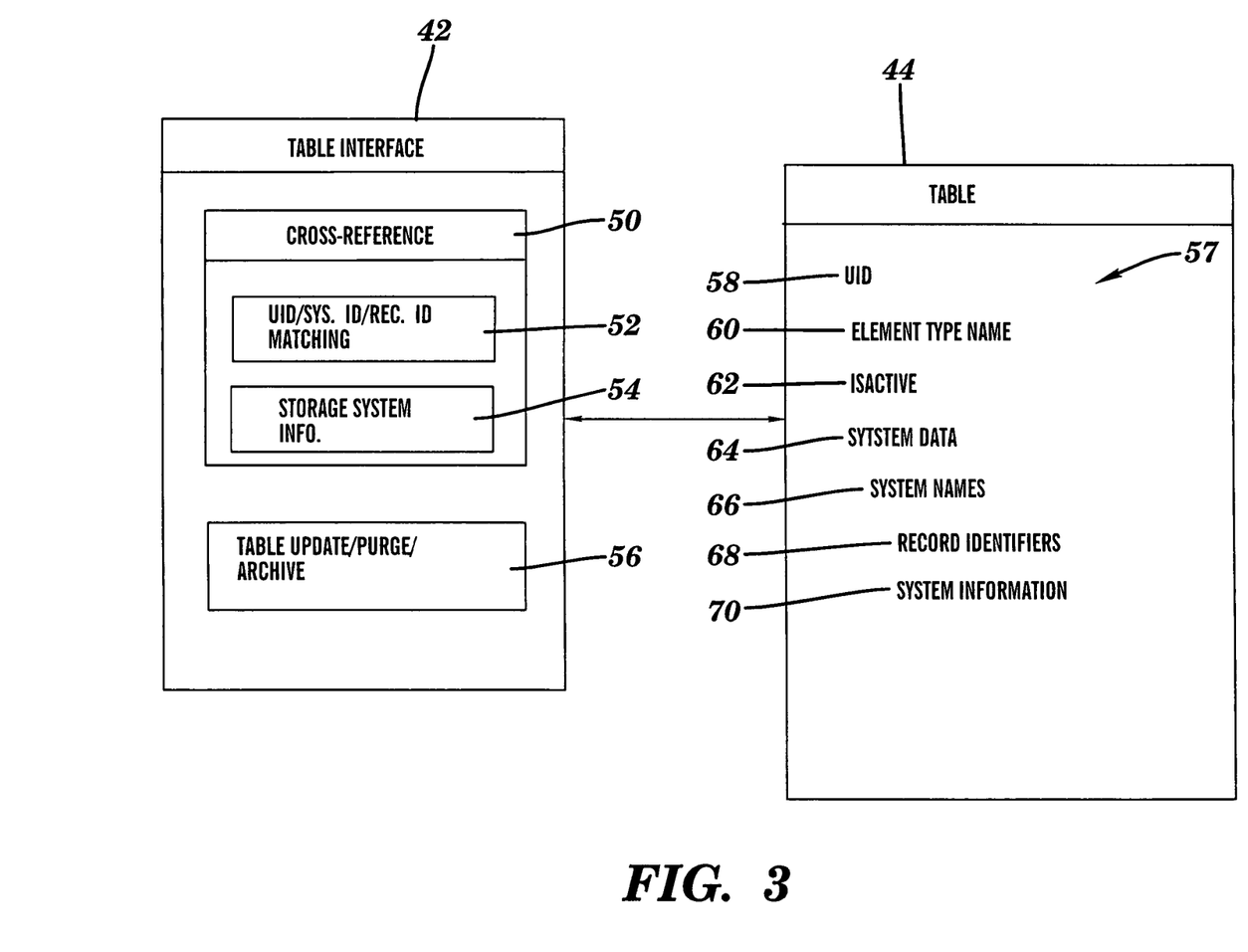
FIG. 3 depicts the table interface and table of FIG. 2.

Referring now to FIG. 3, the table interface 42 and table 44 are shown in greater detail. In particular, table interface includes cross-reference system 50 and table update system 56. Cross-reference system 50, includes: (1) identifier matching system 52, which utilizes an identifier received from a sending system to obtain information pertaining to other storage systems (i.e., receiving storage systems) where the treated or referenced data element is also stored; and (2) storage system information system 54, which obtains additional system information in the event a storage system requires this information (in addition to record identifiers) to locate a treated or referenced data element. Table update system 56 will update the table 44 when a data element is created, deleted, moved or otherwise is altered in a manner that effects the location of data within a storage system. Moreover, table update system 56 manages the table 44 over time. For example, some users may require that all data not accessed in a certain time period be archived, or that data no longer stored in any storage system be purged. This helps prevent the table 44 from growing beyond a manageable size.

Table 44 includes keys 57 that each correspond to a particular data element as stored in the storage systems. For each data element, the key 57 includes a universal identifier (Global Unique Identifier) 58, a data element type name 60 (e.g., "customer record," "policy record," etc.), is active (Boolean) feature 62 to denote whether a particular data element is still in use or stored by any storage system and system data 64. System data 64 includes the names 66 of all storage systems where a particular data element is stored, respective record identifiers 68 to indicate the locations of the data element within the storage systems and optional system information 70 to provide additional information regarding where the data element is stored within the particular storage system. System information 70 may explain, for example, the manner in which a data element is stored in three records of the billing storage system 38. The system information 70 for the billing storage system 38 will indicate how the data element is broken down in the three records (e.g., name in record one, address in record two and telephone number in record three).

For each instruction sent to the hub system 24, an action code relating to the treatment or reference of a data element is included. Specifically, a data element can be created, modified, deleted, referenced, moved within a storage system. For each action, the hub system 24 must be informed so that the data element can be synchronized with the other storage systems and/or the table can be updated (via table update system 56). If the table is not updated when, for example, a data element is re-located within the claims storage system 34, the data element as re-located in the claims storage system may not be synchronized when later treated by a different system. Specific illustrative flows with action codes corresponding to the above actions will be described in further detail below.

Figure 4:
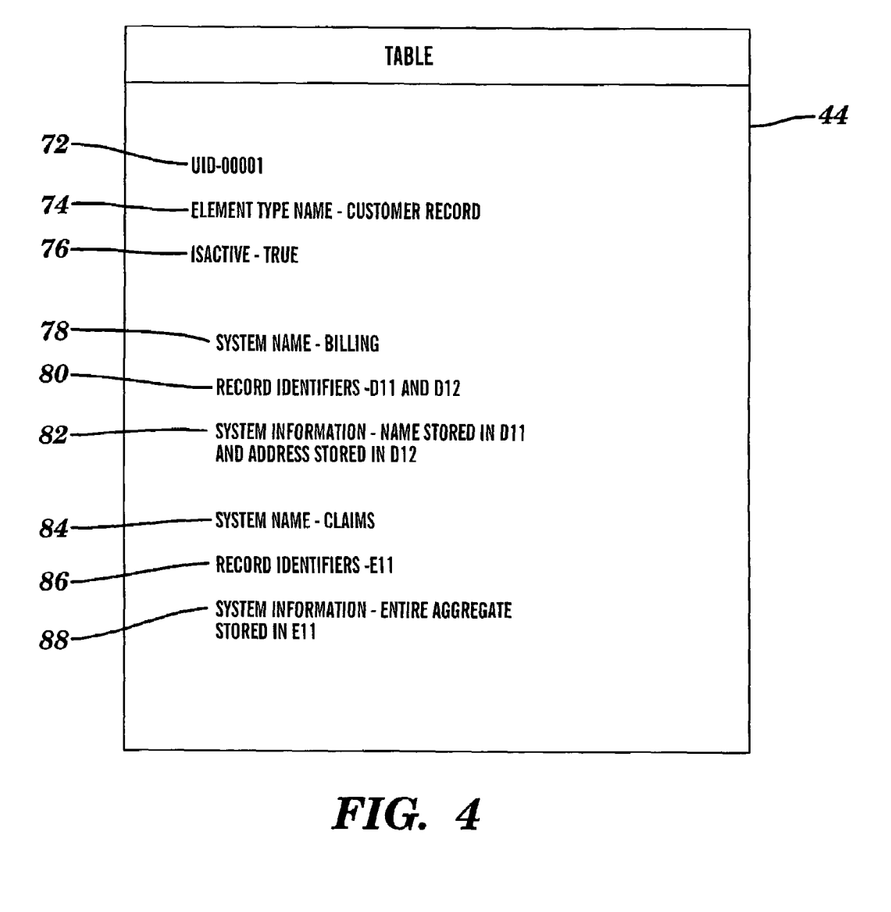
FIG. 4 depicts an exemplary embodiment of the table of FIG. 3.

Referring now to FIG. 4 an exemplary embodiment of the table 44 is shown. For the example shown, the data element is for a particular customer's (e.g., John Smith's) contact information. For this data element a universal identifier 72 is established. The particular universal identifier 72 shown (i.e., 00001) will pertain only to this particular customer's contact information, and for each other data element stored in the storage systems, a different universal identifier will be assigned. This allows the hub system to identify a particular data element based on one reference identifier, regardless of where or how the data element is stored among the various storage systems. Also in the table is the data element type name 74. This is a label that describes the type of data stored as the data element (e.g., customer data, insurance policy data, etc.). As shown in FIG. 4, the data element type name 74 for data element no. 00001 is "customer record." Next, the isactive feature 76 indicates whether the data element is still stored on any of the storage systems. If the value is "true," the data element is still active. If the value is "false," the data element is no longer stored or used by any storage system.

Following the universal identifier 72, data element type name 74 and isactive 76 feature is system data 64 pertaining to storage of the data element within certain storage systems is provided. First, system names 78 and 84 are listed indicating that the data element is stored in the billing and claims storage systems. Record identifiers 80 and 86 indicate the location of the data element within each storage system. As shown, the data element is stored in records D11 and D12 of the billing storage system and record E11 of the claims storage system. System information 82 and 88 then indicate how the data element is broken down between the records. Specifically, the name is stored in record D11 and the address is stored in record D12 of the billing storage system, while the entire data element is stored in record E11 of the claims storage system. It should be appreciated that the table 44 illustrate in FIG. 4 is intended to be illustrative only and may take many forms. For example, the table 44 may be in a spreadsheet or the like. In addition, it should be appreciated that although the data element depicted in table 44 is stored only in the claims and billing storage systems, data elements can exist on more or fewer storage systems.

IV. Illustrative Flows

The various operations of the hub system 34 upon receiving an instruction from a storage system will be illustrated in the following examples. For the purposes of the examples, reference is made to FIG. 2

A. New Data Element Creation

Upon creation of a new data element the hub system 24 must be informed so that the table 44 can be updated and the data element can be replicated on the other storage systems. For example, if the application storage system 34 created a new data element for a new customer, an instruction would be sent to the hub system 24. As indicated above, the instruction would include a header that includes the system name for the application storage system 34, as well as the record identifiers pertaining to the location of the created data element within the application storage system 34. Also, the header can include the data element type name and/or any system information to facilitate location of the data element is stored within application storage system 34. The action code for this instruction would be set to "Created." The hub system 24, upon receiving the instruction, would create a new universal identifier for the data element and a new entry in the table 44. Then, the universal identifier and the header information received from the application storage system 34 would be inputted into the table and the isactive feature set to "true." Thus, the table 44 would include an entry for the new data element that comprises the universal identifier, the application storage system name, the data element type name, the record identifier(s), the system information and an isactive indication of "true."

Once the hub system 24 has created the entry in the table 44, the instruction can be forwarded to the web sales 35, claims 36, billing 38 and customer management 39 storage systems for replication. The header need not include the application storage system 34 information such as application system name, record identifiers, etc. However, the header can include the universal identifier and data element type name. Some users may wish to store the universal identifiers on each storage system so that a particular data element can be more efficiently referenced. Each storage system on which the data element is replicated must then inform the hub system 24 of how the data element is stored so that the entry for the new data element in the table 44 can be updated (described in further detail below).

B. Modification or Reference of Existing Data Element

If an existing data element is modified or referenced, the hub system 24 must be informed so that the other storage systems can be synchronized. For example, if application storage system 34 modified an address for a customer, an instruction would be generated and sent through hub system 24 with the action code set to "Exists." Similarly, if the instruction references, but does not modify, an existing data element, the header would have an action code set to "Exists." If the application storage system 34 knows the universal identifier for the particular data element, it would include it with the header. Upon receiving the instruction, the hub system 24 use the universal identifier to cross-reference other storage systems and their corresponding identifiers where the data element is stored. From the table shown in FIG. 4, each universal identifier is categorized with information regarding precise locations of the data element in the storage systems. Accordingly, the system names, record identifiers and system information for the other storage systems can be accessed based on the universal identifier.

In the event the application storage system 34 does not know the universal identifier for the data element, the header should include at least the application storage system name and record identifiers for where the data element is stored within the application storage system 34. Optionally, the data element type name and system information can be included as well. For example, the header may say: System name—Application; Record Identifiers Z1 and Z2; and Data Element Type Name—Customer Record. Using this information, the hub system 24 can access the table and use the system name and record identifiers as a key to determine the universal identifier for the modified or referenced data element as well as other storage systems that have stored the data element. Once the other storage systems have been identified, the corresponding records and system information for each storage system can also be identified. The instruction would then be forwarded to the other storage systems with a header. The header informs each storage system and/or adapter of the precise location of the modified or referenced data element therein.

In the event a data element is modified or referenced on the application storage system 34, but the table 44 lacks an entry for the data element in another (e.g., the claims) storage system (and the controller 41 concludes the instruction should be forwarded to this storage system), the hub system 24 will forward the modification instruction with a header that includes the universal identifier and data element type name. The receiving storage system may: (1) use the universal identifier or data element type name to identify the data element; (2) create the data element if it does not exist therein; or (3) may take some other action (e.g., query the user). In either case, if the receiving storage system determines a location for the data element, the hub system 24 will be informed and the table 44 updated.

C. Deletion of a Data Element

Similar to creation and modification of a data element, the hub system 24 must be updated upon deletion of a data element by a storage system. For example, if a customer left the company, their contact information data element may be deleted from some or all storage systems. Accordingly, an instruction would be sent from the deleting storage system (e.g., from the applications system 34) to the hub system 24. The instruction includes a header that has either: (1) the universal identifier for the data element or (2) the application storage system name and record identifiers for the data element, as well as an action code that is set to "Deleted." Optionally, the data element type name and system information may be included. Similar to modification of a data element described above, the hub system 24 will use the information in the headers as a key to cross-reference other storage systems and their corresponding information (system identifiers and names, record identifiers, system information, etc.) for where the data element is stored.

Once the other storage systems and corresponding information have been identified/accessed, the instruction will be forwarded so that the other storage systems can likewise delete the data element or take other action as appropriate (e.g., archiving). If the data element is no longer stored in any storage system, the isactive feature will be set to "false" in the table 44. The hub system 24 recognizes this when informed by all storage systems of the deletion of a particular data element from their systems.

D. Updating Identifiers

As indicated above, the table 44 must be updated when an existing data element is added to a storage system, or when a change in the location of a data element within a storage system occurs. With respect to the former, the hub system 24 must be informed so that the table 44 can reflect the proper location of the data element within the storage system. For example, if the claims storage system 36 replicated an existing data element (e.g., pursuant to an instruction from the application storage system 34) it may inform the hub system 24 of the internal location of the created data element. Accordingly, the claims storage system 36 would send a message to the hub system 24 with the universal identifier of the data element, as well its system name, record identifiers, system information and an action code set to "AttachId." Once received, the information would be inputted into the table via the table reference system of the table interface 42. Thus, the next time this newly replicated data element is referenced, the claims storage system's storage location for this data element would be available to the hub system 24.

In addition, it might be necessary for a storage system to update or change the internal location of a data element. For example, the application storage system 34 may move a data element from records Z1 and Z2 to C2. In this case, the application storage system 34 would forward the universal identifier (if known), its system name, old record identifiers, new record identifiers and any system information to the hub system 24. The action code would be set to "ModifyId" and would result in the table 44 being revised to reflect the moving of the data element from records Z1 and Z2 to record C2 of the applications storage system 34.

Since the table 44 is maintained and updated in one central location (i.e., the hub system 24), the need for the separate maintenance of data element information on each storage system is eliminated. However, it should be understood that certain information (e.g., universal identifier) may still be maintained on each storage system.

It should be appreciated that some systems may require approval prior to creating and/or deleting a data element and making a corresponding entry in the table 44. Accordingly, the instruction could be sent to an approval system (not shown) first. In one embodiment, the application storage system 34 would send the instruction directly to the approval system without going through the hub system 24. Upon approval, the data element could be created/deleted and the hub system 24 informed as described above. In another embodiment, the instruction may pass through the hub system 24 to get to the approval system. In this case, the action code could be set to "Pass Through." This would tell the hub system 24 to take no action and to forward the instruction to the approval system. Upon approval, the hub system 24 would forward the approval to the application storage system 34, which can then create/delete the data element. Alternatively, upon approval, the approval system could create/delete the data element first and then change the action code from "pass through" to "created/deleted." The instruction would then be sent back to the hub system 24, which would create/delete an entry in the table as described above, except that in this case two entries would be created/deleted (one for the approval storage system and one for the application storage system 34). Any other storage system 35-36 and 38-39, if required, would then receive the instruction so that they can be synchronized. Once synchronized, the hub system 24 is informed so that the table 44 can be updated.

Figure 7:
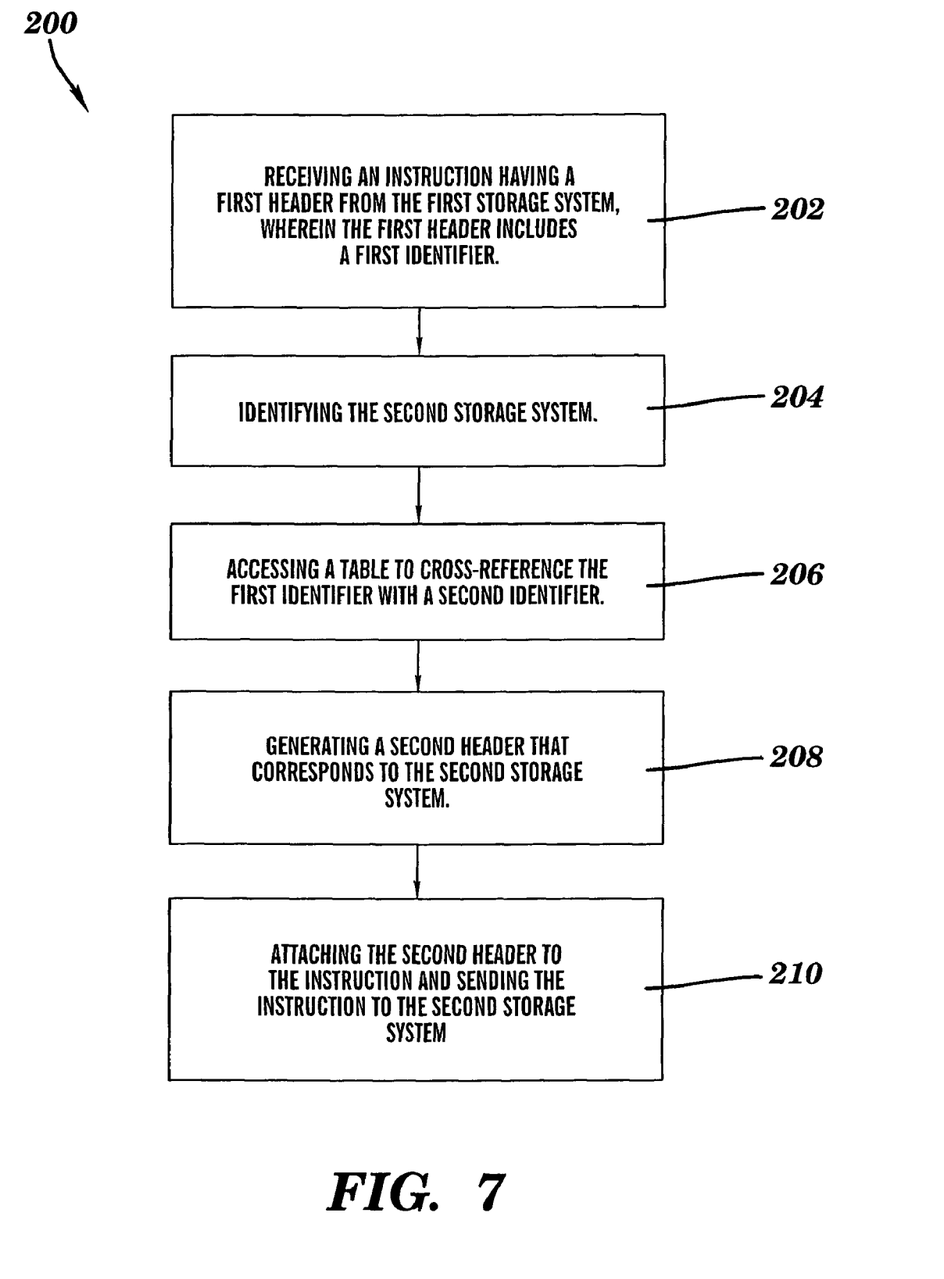
FIG. 7 depicts a flow chart of a method according to the present invention.

Referring now to FIG. 7, a flow chart of a method 200 for synchronizing related data elements between a first and second storage system, according to the present invention, is depicted. The first step 202 of method 200 is to receive an instruction having a header from the first storage system, wherein the first header includes a first identifier. The second step 204 is to is to identify the second storage system. Next, the third step 206 is to access a table to cross-reference the first identifier with a second identifier. The fourth step 208 is to generate a second header that corresponds to the second storage system. The fifth step is to attach the second header to the instruction and send the instruction to the second storage system.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A system comprising a first and second storage system and a table of keys for synchronizing related data elements between a first and second storage system, each key comprising:

a universal identifier corresponding to a data element in the first and second storage system;

a first record identifier corresponding to the data element in the first storage system; and a second record identifier corresponding to the data element stored in the second storage system, wherein the universal identifier, the first record identifier and the second record identifier are used to synchronize the data element between the first and second storage system, wherein the table of keys is separate from all storage systems that store the data in the first storage system and the second storage system.

2. The system of claim 1, wherein each key further comprises a data element type name corresponding to the data element.

3. The system of claim 1, wherein each key further comprises a first system name corresponding to the first storage system.

4. The system of claim 3, wherein each key further comprises a second system name corresponding to the second storage system.

5. The system of claim 1, wherein each key further comprises storage system information corresponding to storage of the data element in a particular storage system.

6. The system of claim 1, further comprising a table interface for cross-referencing and updating the table of keys.

7. The system of claim 6, wherein the table interface includes:

an identifier matching system for cross-referencing record identifiers and universal identifiers; end a table update system for updating the table.

8. The system of claim 7, wherein the table interface further comprises:

a storage information system fur accessing information corresponding to storage of the data element in a particular storage system.

9. The system of claim 1, wherein the first storage system is designed to store first data related to the data element, and wherein the first storage system is designed to stare second data related to the data element, and wherein the first data is designed to be different from the second data.

10. The system of claim 1, wherein the first and second storage system do not separately maintain information for synchronizing the first and second storages system with each other.

* * * * *